July 6, 1937.   W. W. GARSTANG   2,086,323
VIBRATOR TYPE CONVERTER
Filed Aug. 7, 1936   2 Sheets-Sheet 1

INVENTOR.
William W. Garstang,
BY Hood & Hahn.
ATTORNEYS.

July 6, 1937.  W. W. GARSTANG  2,086,323
VIBRATOR TYPE CONVERTER
Filed Aug. 7, 1936  2 Sheets-Sheet 2

INVENTOR.
William W. Garstang,
BY
Ehrod & Hahn.
ATTORNEYS.

Patented July 6, 1937

2,086,323

UNITED STATES PATENT OFFICE 2,086,323

VIBRATOR TYPE CONVERTER

William W. Garstang, Indianapolis, Ind.

Application August 7, 1936, Serial No. 94,810

21 Claims. (Cl. 175—365)

My invention relates to improvements in converters, and particularly to converters of the tuned vibrating interrupter type.

In the design of converters of the tuned vibrating interrupter type, there are many difficult problems to solve. Of these difficult problems, one of the most important is to be able to design a converter of the tuned vibrating interrupter type that is capable of operating uniformly and energizing an electrical load, without excessive sparking of the tuned vibrating interrupter, under adverse operating conditions of low power factor, or transient or heavy currents. For instance, the load imposed by a radio set is entirely different from the load imposed by synchronous electric motors. Furthermore, in commercial applications, there are many load and power factor conditions which vary throughout a wide range, the load extending from substantially no load to full load, or more, and the power factor from unity for a pure resistance load to 50% or less for synchronous motors or induction coils. Also, there is the problem of taking care of transient currents which tend to cause excessive sparking of a tuned vibrating interrupter. These variable load and power factor conditions and the transient disturbances, impede the operation of the tuned vibrating interrupter and cause excessive sparking at the contact points. This sparking, in turn, affects the electromagnet of the tuned vibrating interrupter and causes erratic movement of the vibrating reed. This action is cumulative until poor operating conditions result.

An object of my invention is the provision of a converter of the tuned vibrating interrupter type which will operate uniformly and energize an electrical load, without excessive sparking of the tuned vibrating interrupter, under conditions of low power factor, or transient or heavy currents.

Another object of my invention is the provision of an oscillating electrical power circuit arranged to deliver an alternating current to a load, and adapted to oscillate at a frequency substantially in agreement with the frequency of the tuned vibrating interrupter.

Another object of my invention is the provision of an electrical oscillating power circuit having resistance to limit the value of the oscillating current, and thus afford a wider disagreement between the frequency of the oscillating circuit and the frequency of the tuned vibrating interrupter.

Another object of my invention is the provision of an oscillating circuit arranged to oscillate at a pre-determined frequency, and deliver an alternating current to an electrical load, taken in combination with a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency to minimize the sparking of the tuned vibrating interrupter caused by an electrical load operating under conditions of low power factor, or transient or heavy currents.

Another object of my invention is the provision of an oscillating circuit having resistance in series with the inductive reactance and the capacitive reactance of the oscillating circuit and to allow a relatively wide disagreement between the frequency of the oscillating circuit and the frequency of the tuned vibrating interrupter.

A still further object of my invention is the provision of an oscillating circuit having a transformer winding with a higher resistance than would ordinarily be used in a good design of a transformer to limit the value of the oscillating current and to allow a relatively wide disagreement between the frequency of the oscillating circuit and the frequency of the tuned vibrating interrupter.

Another object of my invention is the provision of an oscillating electrical power circuit having a transformer and a capacitor for delivering current to a load, taken in combination with a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency and establish a flux in the transformer winding, which when it collapses induces a voltage therein and causes an induced current to flow and charge the capacitor to set up the oscillations, the tuning of the oscillating circuit and the tuned vibrating interrupter being so related to each other that the tuned vibrating interrupter interrupts the flow of the direct current at substantially the place where the induced voltage equals the capacitor voltage and establishes the flow of the direct current at substantially the place where the capacitor voltage is zero, to minimize the sparking of the tuned vibrating interrupter caused by an electrical load operating under conditions of low power factor, or transient or heavy currents.

A further object of my invention is to provide for operating the transformer of the oscillating circuit substantially near or slightly below the knee of the magnetization curve or, in other words, approaching the point of maximum permeability of the transformer iron core.

A still further object of my invention is to provide for operating the transformer of the oscillating circuit near or slightly below the knee of the magnetization curve of the iron core of the transformer to keep the inductive reactance at a relatively constant value so that the circuit may remain tuned at approximately the frequency of the vibrating interrupter, to prevent excessive sparking of the interrupter points.

A still further object of my invention is to provide for the use of a capacitor of lower value in the oscillating circuit, by utilization of a winding of the transformer to step up the voltage impressed upon the capacitor.

A further object of my invention is the provision of a stabilized and relatively high resistance oscillating circuit located between the load and the tuned vibrating interrupter to absorb the electrical shocks which are imposed upon the tuned vibrating interrupter and prevent excessive sparking of the tuned vibrating interrupter under conditions of low power factor, or transient or heavy current.

Another object of my invention is the provision of an auto-transformer utilized as part of the oscillating circuit, wherein the transformer winding has a higher resistance than would ordinarily be used in a theoretically good design of a transformer to limit the value of the oscillating current and to allow a relatively wide disagreement between the frequency of the oscillating current and the frequency of the tuned vibrating interrupter.

I have found that converters of the vibrator interrupter type will operate more satisfactorily on a load having a leading power factor characteristic than on a load having a lagging power factor characteristic or, in other words, a load where the current lags the voltage. Consequently, if definite agreement between the frequency of the vibrating interrupter and the oscillating circuit cannot be attained, it is preferable to have the vibrator frequency higher than the oscillating circuit frequency.

Therefore, a still further object of my invention is the provision of a tuned vibrating interrupter arranged to oscillate at a predetermined frequency for repeatedly interrupting the flow of a direct current and causing the direct current to intermittently energize an oscillating power circuit, wherein the oscillating circuit, under conditions of substantially unity power factor loads, oscillates at a frequency less than the frequency of the tuned vibrating interrupter and, under conditions of increasing inductive loads oscillate at a higher frequency which approaches and coincides substantially with the frequency of the tuned vibrating interrupter, to minimize the sparking of the tuned vibrating interrupter under conditions of lagging power factor loads.

Another object of my invention is to make the frequency of the power oscillating circuit approach the frequency of the tuned vibrating interrupter as the lagging power factor of the load decreases, thereby making the disagreement between the frequency of the oscillating circuit and the tuned vibrating interrupter be a minimum under conditions of low power factor loads where the current lags the voltage.

Other objects and a fuller understanding of my invention may be had by referring to the following description and claims, taken in conjunction with the accompanying drawings, in which:

Figure 1:
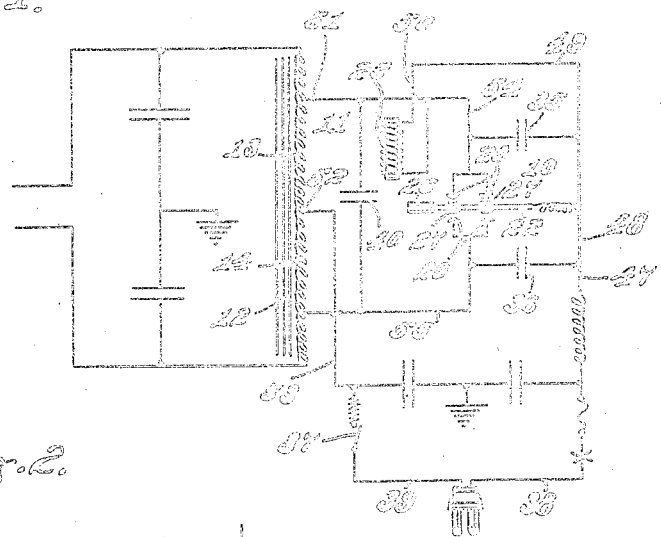
Fig. 1 is a diagrammatic view of an electrical converter of the tuned vibrating interrupter type embodying the features of my invention.

With reference to Fig. 1 of the drawings, my invention comprises, in general, a tuned vibrating interrupter designated generally by the reference character 10, and an oscillating electrical power circuit indicated generally by the reference character 11.

As diagrammatically illustrated, the electrical power oscillating circuit 11 comprises an auto-transformer 12 having two windings 13 and 14, and a capacitor 40 connected in closed circuit relation with the winding of the auto-transformer 12. The load which is connected across a portion of the winding of the auto-transformer may constitute a load ranging from substantially no load to full load or more, or a load varying from unity power factor to 50% or less, or a load exposed to transient disturbances.

The tuned vibrating interrupter 10 has vibrating contacts 27 which are carried by a resilient finger or reed 22 having its lower end stationarily mounted. Mounted upon the upper end of the resilient finger or reed 22 is an armature 26 magnetically actuated to the top, as viewed in the drawings, when the coil 25 is energized. The stationary contacts 28 are carried upon a stationary spring finger. The stationary contacts 29 are similarly mounted upon a spring finger.

In explaining the operation of my tuned vibrating interrupter, let it be assumed that the switch 37 has just been closed. Upon the closing of the switch, the current flows in the following manner: Beginning with the positive supply conductor 38, the current flows through the conductors 47, 48, 49, and 50, the coil 25, the conductor 51, the winding 13 of the auto-transformer 12 to the mid-point 52, the conductor 53, and through the switch 37 to the negative supply conductor 39. Upon the establishment of this circuit, the magnetic flux produced by the current flowing through the coil 25 attracts the vibrating armatures 26 to the top, as viewed in the drawings, until the vibrating contacts 27 engage the stationary contacts 28. As is noted, just as soon as the vibrating contacts 27 engage the stationary contacts 28, the coil 25 is shunted and thus de-energized. This means that the shunted current flows in the following manner: Beginning with the positive supply conductor 38, the current flows through the conductors 47 and 48, the vibrating contact 27, the stationary contact 28, the conductors 54 and 51, the winding 13 of the auto-transformer 12, to the mid-point 52, the conductor 53 and through the switch 37 to the negative supply conductor 39. Just as soon, however, as the vibrating contact 27 engages the stationary contact 28, which de-energizes the coil 25, the resiliency of the vibrating fingers 22 causes the vibrating armature 26 to swing to the bottom, as viewed in the drawings, until the vibrating contacts 27 engage the stationary contacts 29. Just as soon as the vibrating contacts 27 engage the stationary contacts 29, the flow of the shunted current may be traced as follows: Beginning with the positive supply conductor 38, the current flows through the conductors 47 and 48, the vibrating contact 27, the stationary contact 29, the conductor 55, the winding 14 of the auto-transformer 12 to the mid-point 52, the conductor 53 and the switch 37 to the negative supply conductor 39. After the vibrating contacts 27 engage the stationary contacts 29, the vibrating armature 26 is again attracted by the flux produced by the coil 25, because the current which was previously shunted again flows through the coil 25 just as soon as the vibrating contacts disengage the stationary contacts 28. The attracting force of the coil 25 causes the vibrating contacts 27 to swing to the top, as viewed in the drawings, and again engage the stationary contacts 28. This operation is repeatedly continued, and within a very short period, the vibrating armature 26 rapidly gains momentum and reaches a resonance condition, after which the vibrating contacts 27 vibrate between the two sets of stationary contacts 28 and 29 at a substantially uniform rate, which may be determined by the design of the various cooperatively associated parts. In other words, the tuned vibrating interrupter is so designed that it is arranged to vibrate at a predetermined frequency. The condenser 35 which is connected across the vibrating contacts 27 and the stationary contacts 28, and the condenser 36 which is connected across the vibrating contacts 27 and the stationary contacts 29, serve to minimize the sparking which would otherwise take place upon interruption of the circuit.

As just previously noted, the action of the tuned vibrating interrupter 10 causes rapid reversal of the current flowing through the windings 13 and 14 of the auto-transformer 12, and delivers energy to the oscillating circuit to sustain the oscillations thereof. The oscillating circuit, in turn, delivers energy to the load. In the design of my oscillating circuit, the inductive reactance of the auto-transformer 12 and the capacitive reactance of the capacitor 40 are so proportioned that the frequency of the oscillating circuit 11 is substantially the same as the frequency of the tuned vibrating interrupter 10.

In explaining the operation of my tuned vibrating interrupter 10 in combination with the oscillating circuit 11, let it be assumed that the vibrating contacts 27 have just engaged the stationary contacts 28. However, just prior to the engagement of the contacts 27 and 28, the capacitor voltage is zero. Immediately upon the closing of the circuit by the closing of the contacts 27 and 28, the direct current begins to flow through the winding 13 of the auto-transformer and builds up a unidirectional flux. The building up of this flux induces a voltage in the winding of the auto-transformer and immediately causes an induced current to flow to charge the capacitor 40. The induced voltage of the transformer winding immediately reaches a maximum value at the closing of the contacts 27 and 28. In the beginning, the voltage across the output circuit to the load is zero, but gradually builds up as the capacitor 40 is charged by the induced voltage. Just as soon as the contacts open it begins to decrease in substantial accordance with the slope of the magnetization curve of the iron of the transformer. The tuning of the power oscillating circuit 11 and the tuned vibrating interrupter 10 is so arranged that the engagement between the vibrating contacts 27 and 28 is broken at substantially the place where the induced voltage of the transformer equals the voltage across the capacitor. Under this condition, the induced voltage opposes the capacitor voltage with equal and opposite force at the point when the contact is broken, and thus a minimum of current tends to flow through the separating contacts. Therefore, by reason of this synchronous timing of the tuned vibrator interrupter 10 and the oscillating circuit 11, the direct current circuit is interrupted at the point where minimum current tends to flow and thus very little if any sparking takes place.

During the time that the contacts 27 and 28 are closed, the oscillating circuit 11 oscillates under forced oscillations, but when the engagement between the contacts 27 and 28 is broken, the oscillating circuit oscillates under free oscillations. At the beginning of the free oscillation period, the condenser is charged, and the unidirectional flux begins to collapse abruptly and the collapsing flux induces a voltage in the transformer in the opposite direction until a point is reached where the voltage on the condenser becomes zero. At this point, the engagement on the other side of the tuned vibrating interrupter between the contacts 27 and 29 is made, which carries the oscillation of the oscillating circuit through the second half of the cycle, first under a period of forced oscillation so long as the engagement between the contacts 27 and 29 is made and then under a period of free oscillation when the contacts are separated. The operation during the second half of the cycle is the same as that previously explained for the first half, and at the place where the voltage across the condenser is substantially equal to the induced voltage of the auto-transformer, the engagement between the contacts 27 and 29 is broken. The circuit is then set in free oscillation until the vibrating contacts 27 swing over and engage the stationary contacts 28, at which point the cycle of operation is again repeated.

Summarizing, it is noted that the frequency of the oscillating circuit and the frequency of the tuned vibrating interrupter are so correlated that the flow of the direct current is established by the closing of the contacts at the point where the induced voltage of the transformer is substantially equal to the voltage across the condenser, and that the flow of the direct current is interrupted by the separating of the contacts at the place where the condenser voltage is substantially equal to the induced voltage across the coil. Therefore, the excessive sparking caused by adverse load conditions, or transient or high current is minimized.

If the frequency of the oscillating circuit is not in tune with the frequency of the tuned vibrating interrupter, there is a tendency to draw the oscillating circuit in tune, but at the expense of sparking. To avoid this, the free oscillation of the oscillating circuit must be substantially in tune with the free oscillation of the vibrating reed of the tuned vibrating interrupter, so that, when the direct current circuit is made or broken, there is no discontinuity between the forced and free oscillations of the oscillating circuits.

In a further provision of my invention, I limit the value of the oscillating current in order to allow a wider disagreement between the frequency of the oscillating circuit and the frequency of the tuned vibrating interrupter than would be the case if the oscillating current were not limited. In other words, by keeping the value of the oscillating current to a limited value, depending upon the capacity of the converter, the displacement in electrical degrees may be made relatively wide. This is true for the reason that, at high values of oscillating current, the slope at the point where the oscillating current passes through zero is relatively large, and thus the disagreement between the frequency of the oscillating circuit and the tuned vibrating interrupter must be kept at a small value to prevent excessive sparking. If the slope is small, as would be the case of a limited amount of current as it passes through zero, the displacement in electrical degrees may be large without overburdening the tuned vibrating interrupter.

In the preferred form of my invention, I propose to limit the value of the oscillating current by using a transformer winding of relatively high resistance. This is done by using a smaller size wire than would ordinarily be used in a theoretically good design of transformer. The value of this resistance is determined by the rating of the converter. As an example, a converter which is designed to deliver 200 watts output, say at 110 volts alternating current, and operated from 110 volts direct current, would require about 2½ amperes input to the converter to deliver the output. In such an arrangement, a current of over 5 amperes would be detrimental to the tuned vibrator interrupter. Consequently, sufficient resistance is incorporated in the oscillating circuit to limit the oscillating current, so that the output current is maintained under 5 amperes. As has been pointed out, the resistance in the specific structure illustrated is in the form of a smaller size wire and increased number of turns. Where I refer to the capacity of the converter, it will be understood that I refer to the capacity of the converter under normal operating condition. It is, of course, to be recognized that under certain conditions of overload, the converter might carry a much heavier current for short periods without detriment, but where I speak of capacity of the converter, it will be understood that I am referring to the capacity of the converter under normal and continuous conditions.

In a further provision of my invention, I provide for operating the transformer near or slightly below the knee of the magnetization curve of the iron of the transformer. This tends to stabilize the operation of my converter and prevent excessive sparking of the vibrating contacts. The effective resistance, together with the fixed resistance of the oscillating circuit, absorbs the shock imposed upon the vibrating contacts of the tuned vibrating interrupters and prevents excessive sparking. The effective resistance also tends to widen the possible disagreement between the frequency of the oscillating circuit and the frequency of the tuned vibrating interrupter. This provision enables the interrupter to operate throughout a wide range of load conditions varying from substantially no load to full load without subjecting the vibrating contact to excessive sparking.

To prevent excessive sparking the oscillating circuit must be kept oscillating, and the way to keep it oscillating is to isolate the load as much as possible. If the oscillations cease, the sparking becomes excessive, but by adjusting the constants of the oscillating circuit, so that the oscillations are stable at the maximum load and adjusting the turns of the winding of the transformer so that the iron is operated near or below the knee of the magnetization curve, the sparking is maintained at a minimum.

To make my converter operate uniformly throughout a wide range of power factor loads, I provide for so proportioning of the value of the inductive reactance of the transformer and the capacitive reactance of the capacitor that, under substantially unity power factor load, the frequency of the oscillating circuit is somewhat below the frequency of the tuned vibrating interrupter. In other words, the capacitive reactance is less than the inductive reactance of the transformer. However, when an inductive load is connected to the transformer, the total inductive reactance of the transformer and the load decreases and causes the frequency of the oscillating circuit to rise and approach or coincide with the frequency of the tuned vibrating interrupter. Therefore, my invention is capable of taking care of wide variation in power factor loads, because the frequency of the oscillating circuit and the frequency of the tuned vibrating interrupter are substantially in agreement under the lowest power factor load conditions. In other words, there is a close agreement between the frequency of the oscillating circuit and the tuned vibrating interrupter at the place where the conditions which causes the sparking are the worst.

Or, stating it in another way, by making the capacity reactance of the capacitance 40 substantially equal to the inductive reactance of the output circuit and thereby balancing such reactance, I am enabled to correct the power factor of the load imposed on the transformer to approximate unity.

Figure 7:
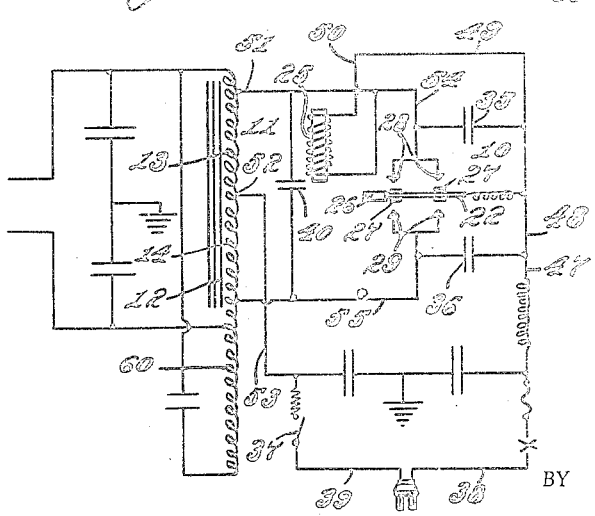
Fig. 7 is a diagrammatic view of a modified form of my invention, in that the transformer voltage is stepped up to impress a higher voltage upon the capacitor of the oscillating circuit of my invention.

In Fig. 7, I show a modified form of my invention, in that the capacitor 40 is impressed with a step-up voltage of the transformer by using the additional winding 60. This increases the effective capacity of the capacitor upon the oscillating circuit so that greater correction may be obtained from a given size capacitor.

Figure 2:
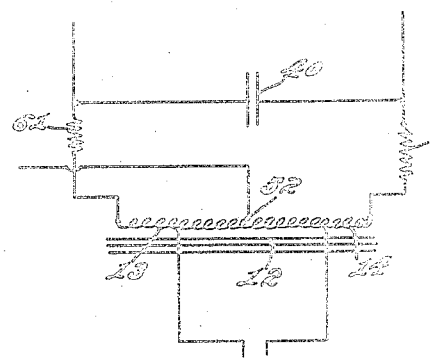
Fig. 2 is a modified form of my invention, in that the resistance units are placed in series with the capacitor and the transformer of the oscillating circuit of my invention.
Figure 3:
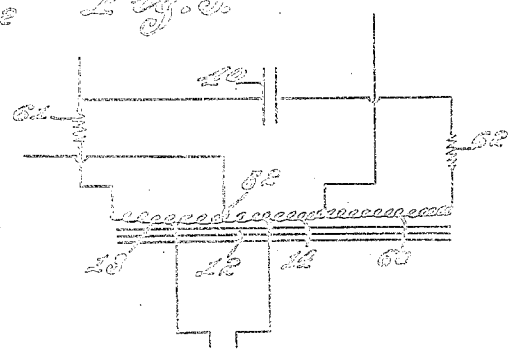
Fig. 3 is a view similar to Fig. 2, except that the oscillating circuit is arranged to have resistance units connected in series with the capacitor and the winding transformer.

The Figs. 2 and 3 are a modified arrangement of Figs. 1 and 7, respectively, in that the resistance of the oscillating circuit takes the form of resistor units 61 and 62, instead of the high resistance winding transformer, as previously explained.

Figure 4:
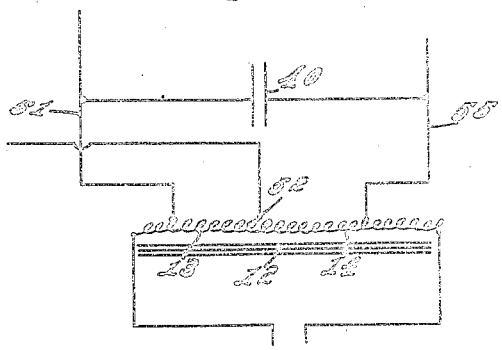
Fig. 4 is a still further modified form of my invention, in that the auto-transformer is a step up transformer instead of a step down transformer as shown in the other views of my invention.

The Fig. 4 is substantially the same as Fig. 1, except that the auto-transformer is a step-up transformer instead of a step-down transformer.

Figure 5:
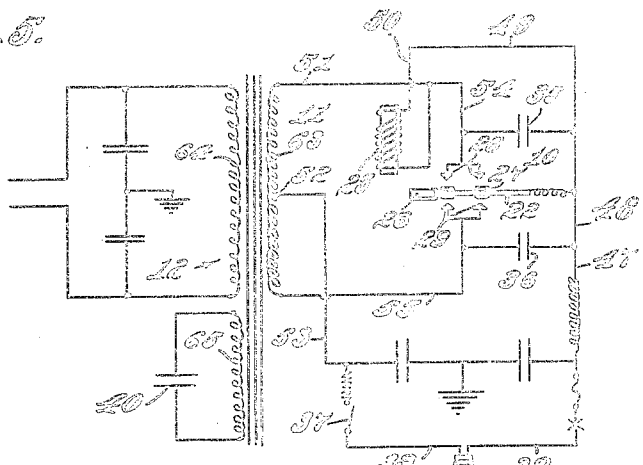
Fig. 5 is a diagrammatic view of a modified circuit arrangement of a converter embodying my invention.

In Fig. 5, I have illustrated a modification of the invention wherein instead of incorporating the capacity 40 in the circuit of the transformer in the manner illustrated in Fig. 1, I have incorporated the capacity in a supplemental winding on the core of the transformer. In this structure, the primary winding 63 of the transformer is connected in the manner indicated in Fig. 1, the secondary winding 64 of the transformer is connected to the load, a supplemental winding 65 is provided on the transformer core, and the capacity 40 is connected in the circuit of this winding. The effect of this arrangement, however, is the same as the effect of the capacity 40 in the structure illustrated in Fig. 1.

Figure 6:
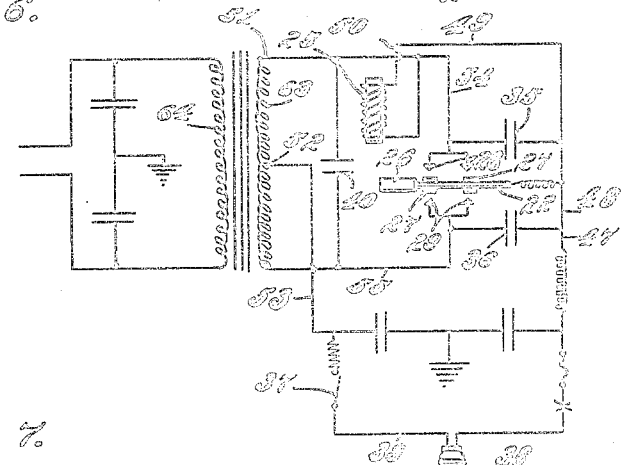
Fig. 6 is a diagrammatic view of a still further modification.

In Fig. 6, I have illustrated a transformer of the type shown in Fig. 5 but in this instance, I have illustrated the capacity 40 as being connected in the same manner as it is connected in the structure illustrated in Fig. 1.

The operation of the modified arrangements is substantially the same as that described with reference to Fig. 1. It is to be pointed out that a converter embodying the features of my invention, as shown and described therein, actually gives uniform operation, without excessive sparking, under adverse power factor and load conditions, the load ranging from substantially no load to full load or more, and the power factor ranging from unity to 50% or less, as well as under transient disturbances, and for this reason it is to be clearly understood that the principle or theory of operation of my invention as explained herein, is to be construed as being merely explanatory. The foregoing description of the principle of operation constitutes the best known theoretical explanation of its operation. Therefore, in no sense shall the theory of operation herein described be construed as a limitation upon the claims, as there may be other explanations of its theory or principle of operation.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed, as for example, I have illustrated one specific type of vibrating reed interrupter. It will be understood, however, that other types of interrupters may be used; for example, the type of interrupter wherein the oscillating member or switch arm may be motor driven with a constant period of vibration or oscillation.

I claim as my invention:

1. A converter of the vibrating interrupter type for converting direct current into alternating current and for utilizing the said alternating current to energize an electrical load, which under conditions of low power factor, or transient or heavy currents tends to cause excessive sparking of the vibrating interrupter, comprising, in combination, an oscillating circuit having resistance, inductive reactance and capacitive reactance arranged to oscillate at a predetermined frequency and deliver an alternating current to the electrical load, and a vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency to minimize the sparking of the vibrating interrupter caused by an electrical load having lagging power factor characteristics, or transient or heavy currents, the resistance of the oscillating circuit being in series with the inductive reactance and the capacitive reactance and of such value as to allow a relatively wide disagreement between the frequency of the oscillating circuit and the frequency of the vibrating interrupter.

2. A converter of the tuned vibrating interrupter type for converting direct current into alternating current and for utilizing the said alternating current to energize an electrical load, which under conditions of lagging power factor, or transient or heavy currents tends to cause excessive sparking of the tuned vibrating interrupter, comprising, in combination, an oscillating circuit having an output transformer and a capacitor arranged to oscillate at a predetermined frequency, said transformer being arranged to deliver an alternating current to the load, and a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency to minimize the sparking of the tuned vibrating interrupter caused by an electrical load having a lagging power factor, or transient or heavy currents, said transformer winding having a higher resistance than would ordinarily be used in a theoretically good design of a transformer to limit the value of the oscillating current and to allow a relatively wide disagreement between the frequency of the oscillating circuit and the frequency of the tuned vibrating interrupter.

3. A converter of the vibrating interrupter type for converting direct current into alternating current and for utilizing the said alternating current to energize an electrical load, which under conditions of low power factor, or transient or heavy currents tends to cause excessive sparking of the vibrating interrupter, comprising, in combination, an oscillating circuit having an output transformer and a capacitor arranged to oscillate at a predetermined frequency, said transformer being arranged to deliver an alternating current to the load, and a vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency and establish a flux in the transformer winding, which when it collapses induces a voltage therein and causes an induced current to flow and charge the capacitor to set up the oscillations, the tuning of the oscillating circuit and the vibrating interrupter being so related to each other that the vibrating interrupter interrupts the flow of the direct current at substantially the place where the induced voltage equals the capacitor voltage and establishes the flow of the direct current at substantially the place where the capacitor voltage is zero to minimize the sparking of the vibrating interrupter caused by an electrical load operating under conditions of low power factor, or transient or heavy currents, said oscillating circuit having resistance in series with the capacitor of such value as to limit the value of the oscillating current to substantially the current-carrying ability of the interrupter and allow a relatively wide disagreement between the frequency of the oscillating circuit and the frequency of the vibrating interrupter.

4. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having an output transformer and a capacitor arranged to oscillate at a predetermined frequency, said transformer being arranged to deliver an alternating current to the load, and a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency and establish a flux in the transformer winding, which when it collapses induces a voltage therein and causes an induced current to flow and charge the capacitor to set up the oscillations, the tuning of the oscillating circuit and the tuned vibrating interrupter being so related to each other that the vibrating interrupter interrupts the flow of the direct current at substantially the place where the induced voltage equals the capacitor voltage and establishes the flow of the direct current at substantially the place where the capacitor voltage is zero to minimize the sparking of the tuned vibrating interrupter caused by an electrical load operating under conditions of low power factor, or transient or heavy currents, said transformer winding having a higher resistance than would ordinarily be used in a theoretically good design of a transformer to limit the value of the oscillating current and to allow a relatively wide disagreement between the frequency of the oscillating current and the frequency of the tuned vibrating interrupter.

5. A converter of the tuned vibrating interrupter type for converting direct current into alternating current and for utilizing the said alternating current to energize an electrical load, which under conditions of low power factor, tends to cause excessive sparking of the tuned vibrating interrupter, comprising, in combination, an oscillating circuit having a transformer and a capacitor, said transformer being arranged to deliver current to the load, and a tuned vibrating interrupter arranged to oscillate at a predetermined frequency for repeatedly interrupting the flow of the direct current and causing the direct current to intermittently energize the oscillating circuit, said oscillating circuit being arranged under conditions of a substantially unity power factor loads, to oscillate at a frequency less than the frequency of the tuned vibrating interrupter and, under conditions of decreasing power factor loads, to oscillate at a higher frequency which approaches the frequency of the vibrating interrupter to minimize the sparking of the tuned vibrating interrupter under conditions of low power factor loads.

6. A converter of the vibrating interrupter type for converting direct current into alternating current and for utilizing the said alternating current to energize an electrical load, which under conditions of low power factor, or transient or heavy currents tends to cause excessive sparking of the vibrating interrupter, comprising, in combination, an oscillating circuit having a transformer and a capacitor, said transformer being arranged to deliver current to the load, and a vibrating interrupter arranged to oscillate at a predetermined frequency for repeatedly interrupting the flow of the direct current and causing the direct current to intermittently energize the oscillating circuit, said oscillating circuit being arranged under conditions of a substantially unity power factor loads to oscillate at a frequency less than the frequency of the vibrating interrupter and, under conditions of lagging power factor loads, to oscillate at a higher frequency which approaches the frequency of the vibrating interrupter to minimize the sparking of the vibrating interrupter under conditions of lagging power factor loads, said oscillating circuit having resistance in series with the capacitor of such a value as to limit the value of the oscillating current to the current-carrying capacity of the vibrating interrupter and allow a relatively wide disagreement between the frequency of the oscillating circuit and the frequency of the vibrating interrupter.

7. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having a transformer and a capacitor, said transformer being arranged to deliver current to the load, and a tuned vibrating interrupter arranged to oscillate at a predetermined frequency for repeatedly interrupting the flow of the direct current and causing the direct current to intermittently energize the oscillating circuit, said oscillating circuit being arranged under conditions of a substantially unity power factor loads to oscillate at a frequency less than the frequency of the tuned vibrating interrupter and, under conditions of decreasing power factor loads, to oscillate at a higher frequency which approaches the frequency of the tuned vibrating interrupter to minimize the sparking of the tuned vibrating interrupter under conditions of low power factor loads, said transformer winding having a higher resistance than would ordinarily be used in a theoretically good design of a transformer to limit the value of the oscillating current and to allow a relatively wide disagreement between the frequency of the oscillating circuit and the frequency of the tuned vibrating interrupter.

8. A converter of the tuned vibrating interrupter type for converting direct current into alternating current and for utilizing the said alternating current to energize an electrical load, which under conditions of low power factor, tends to cause excessive sparking of the tuned vibrating interrupter, comprising, in combination an oscillation circuit, having a transformer and a capacitor, said transformer being arranged to deliver current to the load, and a tuned vibrating interrupter arranged to oscillate at a predetermined frequency for repeatedly interrupting the flow of the direct current and causing the direct current to intermitteny energize the oscillating circuit, the inductive reactance of the transformer being greater than the capacitive reactance of the capacitor to cause the oscillating circuit, under conditions of substantially unity power factor load, to oscillate at a frequency less than the frequency of the tuned vibrating interrupter and, under conditions of lagging power factor loads, to oscillate at a higher frequency which approaches the frequency of the tuned vibrating interrupter to minimize the sparking of the tuned vibrating interrupter under conditions of low power factor loads.

9. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit, having an output transformer and a capacitor arranged to oscillate at a predetermined frequency, said transformer being arranged to deliver an alternating current to the load, and a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency to minimize the sparking of the tuned vibrating interrupter caused by an electrical load operating under conditions of low power factor, or transient or heavy currents, said transformer winding having a higher resistance than would ordinarily be used in a theoretically good design of a transformer to limit the value of the oscillating current and to allow a relatively wide disagreement between the frequency of the oscillating circuit and the frequency of the tuned vibrating interrupter, said transformer being operated at a relatively low saturation to decrease the hysteresis loss and the effective resistance of the oscillating circuit for further limiting the value of the oscillating current with increasing loads to allow a relatively wide disagreement between the frequency of the oscillating current and the frequency of the tuned vibrating interrupter.

10. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having an output transformer and a capacitor arranged to oscillate at a predetermined frequency, said transformer being arranged to deliver an alternating current to the load, and a tuned vibrating interrupter arranged to oscillate at a frequency substantially the same as the frequency of the oscillating circuit for repeatedly interrupting the flow of the direct current and causing the direct current to intermittently energize the oscillating circuit at a substantially synchronous frequency to minimize the sparking of the tuned vibrating interrupter caused by an electrical load operating under conditions of low power factor, or transient or heavy currents, said transformer being operated at a relatively low saturation to decrease the hysteresis loss and the effective resistance of the oscillating circuit and to maintain the permeability relatively constant, thus permitting a relatively wide disagreement between the frequency of the oscillating circuit and the frequency of the tuned vibrating interrupter.

11. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having a transformer and a capacitor, said transformer being arranged to oscillate at a predetermined frequency for repeatedly interrupting the flow of the direct current and causing the direct current to intermittently energize the oscillating circuit, said oscillating circuit being arranged under conditions of a substantially unity power factor loads to oscillate at a frequency less than the frequency of the tuned vibrating interrupter and, under conditions of decreasing power factor loads, to oscillate at a higher frequency which approaches the frequency of the tuned vibrating interrupter to minimize the sparking of the tuned vibrating interrupter under conditions of low power factor loads, said oscillating circuit having resistance in series with the capacitor to limit the value of the oscillating current and allow a relatively wide disagreement between the frequency of the oscillating circuit and the frequency of the tuned vibrating interrupter, said transformer being operated at a relatively low saturation to decrease the hysteresis loss and the effective resistance of the oscillating circuit and to maintain the permeability relatively constant, thus limiting the peak and transient currents to a value which will not cause destructive action at the contact points of the interrupter.

12. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having a transformer and a capacitor, said transformer being arranged to deliver current to the load, and a tuned vibrating interrupter arranged to oscillate at a predetermined frequency for repeatedly interrupting the flow of the direct current and causing the direct current to intermittently energize the oscillating circuit, said oscillating circuit being arranged under conditions of a substantially unity power factor loads, to oscillate at a frequency less than the frequency of the tuned vibrating interrupter and, under conditions of decreasing power factor loads, to oscillate at a higher frequency in the neighborhood of the frequency of the tuned vibrating interrupter to minimize the sparking of the tuned vibrating interrupter under conditions of low power factor loads, said transformer being operated at a relatively low saturation to decrease the hysteresis loss and the effective resistance of the oscillating circuit and to maintain the permeability relatively constant, thus limiting the peak and transient currents to a value which will not cause destructive action at the contact points of the interrupter.

13. A converter of the tuned vibrating interrupter type for converting direct current into alternating current and for utilizing the said alternating current to energize an electrical load, which under conditions of low power factor, or transient or heavy currents tends to cause excessive sparking of the tuned vibrating interrupter, comprising, in combination, an oscillating circuit having a transformer and a capacitor, said transformer being arranged to deliver current to the load, and a tuned vibrating interrupter arranged to oscillate at a predetermined frequency for repeatedly interrupting the flow of the direct current and causing the direct current to intermittently energize the oscillating circuit, the inductive reactance of the transformer being less than the capacitive reactance of the capacitor to cause the oscillating circuit, under conditions of substantially unity power factor load, to oscillate at a frequency less than the frequency of the tuned vibrating interrupter and under conditions of decreasing power factor loads, to oscillate at a higher frequency which approaches the frequency of the tuned vibrating interrupter to minimize the sparking of the tuned vibrating interrupter under conditions of low power factor loads, said transformer winding having a higher resistance than would ordinarily be used in a theoretically good design of a transformer to limit the value of the oscillating current and to allow a relatively wide disagreement between the frequency of the oscillating circuit and the frequency of the tuned vibrating interrupter, said transformer being operated at a relatively low saturation and to maintain the permeability relatively constant, thus limiting the peak and transient currents to a value which will not cause destructive action at the contact points of the interrupter.

14. A converter of the tuned vibrating interrupter type for converting direct current into alternating current and for utilizing the said alternating current to energize an electrical load, which under conditions of low power factor, tends to cause excessive sparking of the tuned vibrating interrupter, comprising, in combination, an oscillating circuit having a transformer and a capacitor, said transformer being arranged to deliver current to the load, means for impressing a higher voltage upon the capacitor thus increasing the effect on the circuit, and a tuned vibrating interrupter arranged to oscillate at a predetermined frequency for repeatedly interrupting the flow of the direct current and causing the direct current to intermittently energize the oscillating circuit, said oscillating circuit being arranged under conditions of a substantially unity power factor loads, to oscillate at a frequency less than the frequency of the tuned vibrating interrupter and, under conditions of lagging power factor loads, to oscillate at a higher frequency which approaches the frequency of the tuned vibrating interrupter to minimize the sparking of the tuned vibrating interrupter under conditions of low power factor loads.

15. The combination with a source of potential, of a transformer of the auto-type, a vibrating switch for alternately closing the circuit from said source of potential through a portion of the winding of said transformer in opposite directions, a capacity connected across the terminals of the primary winding of said transformer of sufficient value to correct the power factor of the load imposed on said transformer to approximate unity, the winding of said transformer having a sufficient resistance value to limit the current input into the circuit of said transformer to the maximum capacity of said switch.

16. The combination with a source of potential, of a transformer, a vibrating switch for closing the circuit from said source of potential through at least a portion of the windings of said transformer in opposite directions, a capacity connected across the windings of the transformer of sufficient value to correct the power factor of the load imposed on said transformer to approximate unity, and the resistance of the circuit including said switch having a sufficient value to limit the current input into the circuit of the transformer to the maximum capacity of the switch.

17. The combination with a source of potential, of a transformer, a vibrating switch for alternately closing the circuit from said source of potential through a portion of the winding of said transformer in opposite directions, a capacity connected across the transformer windings of sufficient value to correct the power factor of the load imposed on said transformer to approximate unity, said circuit including a resistance in the primary winding circuit of the transformer of sufficient value to limit the current input into the circuit to the maximum capacity of the switch.

18. The combination with a source of potential, of a transformer, a vibrating switch including a vibrating reed and contacts disposed on opposite sides of said reed adapted to be alternately engaged by said reed, said reed being connected with one side of the power line, a transformer of the auto-type, the contacts disposed on the opposite sides of said reed being respectively connected to the primary winding of said transformer, said winding being connected intermediate of its ends with the opposite side of the power line, and a capacity connected across at least a portion of said winding of sufficient value to correct the power factor of the load imposed on the transformer to approximate unity, said transformer circuit including a resistance in the primary winding circuit of sufficient value to limit the current input into the circuit to the maximum capacity of the contacts of said vibrating switch.

19. The combination with a source of potential, of a transformer, a vibrating switch for alternately closing the circuit from said source of potential through a portion of the winding of said transformer in opposite directions, and a capacity connected across the terminals of at least a portion of a winding of said transformer of such a value that the capacitive reactance of the capacitor is less than the inductive reactance of the transformer, the winding of said transformer having sufficient resistance value to limit the current input to the circuit to the maximum capacity of said switch.

20. The combination with a source of potential, of a transformer of the auto-type, a vibrating switch for alternately closing the circuit from said source of potential through a portion of the winding of said transformer in opposite directions, and a capacity connected across the terminals of at least a portion of a winding of said transformer of such value that the capacitive reactance of the capacitor is less than the inductive reactance of the transformer, the winding of said transformer having sufficient resistance value to limit the current input to the circuit to the maximum capacity of said switch.

21. The combination with a source of potential, of a transformer, a vibrating switch for alternately closing the circuit from said source of potential through a portion of the winding of said transformer in opposite directions and a capacity connected across the terminals of at least a portion of the winding of said transformer of such a value that capacitive reactance of the capacitor is less than the inductive reactance of the transformer, the winding of said transformer having a sufficient resistance value to limit the value of the peak and transient currents therethrough to a value below that which causes destructive arcing of the contacts of said switch.

WILLIAM W. GARSTANG.